United States Patent
Segal et al.

(10) Patent No.: US 10,349,224 B2
(45) Date of Patent: Jul. 9, 2019

(54) MEDIA AND COMMUNICATIONS IN A CONNECTED ENVIRONMENT

(71) Applicant: Essential Products, Inc., Palo Alto, CA (US)

(72) Inventors: Mara Clair Segal, San Francisco, CA (US); Manuel Roman, Sunnyvale, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/673,187

(22) Filed: Aug. 9, 2017

(65) Prior Publication Data

US 2018/0213364 A1    Jul. 26, 2018

Related U.S. Application Data

(63) Continuation-in-part of application No. 15/599,409, filed on May 18, 2017, and a continuation-in-part of application No. 15/599,413, filed on May 18, 2017.

(60) Provisional application No. 62/486,380, filed on Apr. 17, 2017, provisional application No. 62/486,385, filed on Apr. 17, 2017, provisional application No.
(Continued)

(51) Int. Cl.
| | | |
|---|---|---|
| *H04W 48/20* | (2009.01) | |
| *H04W 4/02* | (2018.01) | |
| *H04N 7/15* | (2006.01) | |
| *H04L 29/08* | (2006.01) | |
| *H04L 12/58* | (2006.01) | |
| *H04L 29/06* | (2006.01) | |
| *H04W 4/04* | (2009.01) | |
| *H04W 4/029* | (2018.01) | |

(Continued)

(52) U.S. Cl.
CPC ............. *H04W 4/043* (2013.01); *H04L 51/20* (2013.01); *H04L 67/18* (2013.01); *H04N 7/15* (2013.01); *H04W 4/02* (2013.01); *H04W 4/029* (2018.02); *H04W 48/20* (2013.01); *H04L 65/403* (2013.01); *H04W 4/33* (2018.02); *H04W 84/12* (2013.01)

(58) Field of Classification Search
CPC ....... H04W 48/20; H04W 4/02; H04W 4/021; H04W 4/29; H04N 7/15
See application file for complete search history.

(56) References Cited

U.S. PATENT DOCUMENTS 7,003,463 B1    2/2006 Maes et al.
9,729,821 B1 *  8/2017 Fineberg ................ H04N 7/148
(Continued)

OTHER PUBLICATIONS

M. Szczys, RFID Tracking System, Feb. 20, 2010, p. 1.*
(Continued)

*Primary Examiner* — Christopher M Crutchfield
(74) *Attorney, Agent, or Firm* — Perkins Coie LLP

(57) ABSTRACT

Providing audio and/or video content from one user to a second user within an environment are described. An electronic device can receive conversational content from one user and determine that it is directed to a second user. The second user can be determined to be within another location of the environment (e.g., a different room of a house) and identify the capabilities of devices within the other location. Play back of the conversational content can then be performed using the identified devices within the other location.

23 Claims, 7 Drawing Sheets

Related U.S. Application Data

62/449,750, filed on Jan. 24, 2017, provisional application No. 62/486,380, filed on Apr. 17, 2017, provisional application No. 62/486,385, filed on Apr. 17, 2017, provisional application No. 62/449,750, filed on Jan. 24, 2017.

(51) Int. Cl.
*H04W 84/12* (2009.01)
*H04W 4/33* (2018.01)

(56) References Cited

U.S. PATENT DOCUMENTS

| | | | |
|---|---|---|---|
| 9,774,998 | B1 | 9/2017 | Soyannwo et al. |
| 2005/0289264 | A1 | 12/2005 | Illowsky et al. |
| 2006/0022802 | A1 | 2/2006 | Bridgelall et al. |
| 2008/0220781 | A1 | 9/2008 | Karia et al. |
| 2009/0213844 | A1 | 8/2009 | Hughston et al. |
| 2010/0141839 | A1* | 6/2010 | Supran .............. G06F 1/1632 348/553 |
| 2010/0279670 | A1 | 11/2010 | Ghai et al. |
| 2012/0231773 | A1* | 9/2012 | Lipovski ........... H04M 1/72552 455/414.1 |
| 2013/0311424 | A1 | 11/2013 | Bartolomé Rodrigo |
| 2014/0032758 | A1 | 1/2014 | Barton et al. |
| 2014/0181886 | A1 | 6/2014 | Goodman et al. |
| 2016/0118036 | A1 | 4/2016 | Cheatham, III et al. |
| 2017/0134919 | A1 | 5/2017 | Nordstrom et al. |

OTHER PUBLICATIONS

J. Orwant, Doppelanger Goes to School: Machine Learning for User Modeling, pp. 1-89, Oct. 19, 1993.*
Restriction Requirement dated Aug. 31, 2017, for U.S. Appl. No. 15/599,413 of Segal, M.C. et al. filed May 18, 2017.
U.S. Appl. No. 15/599,409 of Segal, M. C. et al. filed May 18, 2017.
U.S. Appl. No. 15/599,413 of Segal, M. C. et al. filed May 18, 2017.
U.S. Appl. No. 15/673,217 of Segal, M.C. et al., filed Aug. 9, 2017.
Notice of Corrected Allowability dated Feb. 13, 2018 for U.S. Appl. No. 15/599,413 of Segal, M. C. et al. filed May 18, 2017.
Notice of Allowance dated Jan. 25, 2018, for U.S. Appl. No. 15/599,413 of Segal, M.C. et al. filed May 18, 2017.
International Search Report and Written Opinion dated Feb. 6, 2018 for International Application No. PCT/US2018/13589 filed Jan. 12, 2018, 13 pages.
Szczys, Mike, "RFID Tracking System", Hackaday [Website], Retrieved on Oct. 29, 2017, from <https://hackaday.com/>, Feb. 20, 2010, 1 page.
Ex Parte Quayle Action dated Dec. 21, 2017, for U.S. Appl. No. 15/599,413 of Segal, M.C. et al. filed May 18, 2017.
Non-Final Office Action dated Oct. 5, 2017 for U.S. Appl. No. 15/599,409 of Segal, M., et al., filed May 18, 2017.
Non-Final Office Action dated Feb. 15, 2018 for U.S. Appl. No. 15/673,217 of Segal, M.C. et al. filed Aug. 9, 2017.
U.S. Appl. No. 15/957,402 of Segal, M. C. et al. filed Apr. 19, 2018.
Nagel, K. et al., "The Family Intercom: Developing a Context-Aware Audio Communication System", International Conference on Ubiquitous Computing 2001, Oct. 1, 2001, pp. 1-22.

* cited by examiner

MEDIA AND COMMUNICATIONS IN A CONNECTED ENVIRONMENT

CLAIM FOR PRIORITY

This application is a continuation-in-part of U.S. patent application Ser. No. 15/599,409, entitled "Media and Communications in a Connected Environment," by Segal et al., and filed on May 18, 2017 and this application is also a continuation-in-part of U.S. patent application Ser. No. 15/599,413, entitled "Media and Communications in a Connected Environment," by Segal et al., and filed on May 18, 2017. Both U.S. patent application Ser. Nos. 15/599,409 and 15/599,413 claim priority to U.S. Provisional Patent Application No. 62/486,380, entitled "Media and Communications in a Connected Environment," by Segal et al., and filed on Apr. 17, 2017; U.S. Provisional Patent Application No. 62/486,385, entitled "Media and Communications in a Connected Environment," by Segal et al., and filed on Apr. 17, 2017; and U.S. Provisional Patent Application No. 62/449,750, entitled "Boundless Media and Communications in a Connected Environment," by Segal et al., and filed on Jan. 24, 2017. The content of the above-identified applications are incorporated herein by reference in their entirety.

TECHNICAL FIELD

This disclosure relates to media and communications, and in particular media and communications in a connected environment such as a home.

BACKGROUND

The Internet of Things (IoT) allows for the internetworking of devices to exchange data among themselves to enable sophisticated functionality. For example, devices configured for home automation can exchange data to allow for the control and automation of lighting, air conditioning systems, security, etc. In the smart home environment, this can also include home assistant devices providing an intelligent personal assistant to respond to speech. However, seamlessly providing services across all of the devices in the home can be difficult.

SUMMARY

Some of the subject matter disclosed herein includes a method for facilitating a conversation between a first user at a first location within an environment and a second user at a second location within the environment using devices communicatively coupled with a wireless local area network (WLAN). The method includes receiving conversational content having audio content and video content from the first user and directed towards the second user within the environment, the first user being within the first location of the environment. A processor implementing the method can then determine that the second user is within the second location of the environment, the first location being a different room of the environment than the second location, the second location that the second user is within identified using one or both of audio recognition or visual recognition. Devices within the second location that are capable of providing playback of the audio content and devices within the second location that are capable of providing playback of the video content of the conversational content can also be identified. This results in playing back the audio content using the devices within the second location that are capable of providing playback of the audio content and playing back the video content using the devices within the second location that are capable of providing playback of the video content. The method can also include predicting that the second user will move from the second location to a third location within the environment, the third location being a different room within the environment than the first location or the second location. Devices within the third location that are capable of playback of the audio content of the conversational content can be determined and then play back the audio content using the devices within the third location that are capable of providing playback of the audio content. The volume of the playback of the audio content within the second location and the third location can then be adjusted such that the volume of the playback of the audio content within the third location increases and the volume of the playback of the audio content within the second location decreases as the second user moves from the second location to the third location.

Some of the subject matter described herein also includes a method including receiving conversational content having audio content and video content from a first user and directed towards a second user within an environment, the first user being within a first location of the environment; determining, by a processor, that the second user is within a second location of the environment, the first location being different than the second location; determining, by the processor, devices within the second location that are capable of providing playback of the audio content and devices within the second location that are capable of providing playback of the video content of the conversational content; playing back the audio content of the conversational content using the devices within the second location that are capable of providing playback of the audio content; and playing back the video content of the conversational content using the devices within the second location that are capable of providing playback of the video content.

In some implementations, determining that the second user is within the second location is based on one or both of audio recognition or visual recognition.

In some implementations, the method includes predicting that the second user will move from the second location to a third location within the environment, the third location being different than the first location or the second location; determining devices within the third location that are capable of playback of the audio content of the conversational content; and playing back the audio content using the devices within the third location that are capable of providing playback of the audio content.

In some implementations, the method includes determining that the second user is moving from the second location to the third location; and adjusting volume of the playback of the audio content within the second location and the third location based on the determination that the second user is moving from the second location to the third location.

In some implementations, adjusting the volume of the playback includes adjusting the volume such that the volume of the playback of the audio content within the third location increases and the volume of the playback of the audio content within the second location decreases as the second user moves from the second location to the third location.

In some implementations, the method includes determining characteristics of the second location corresponding to the second user, wherein the devices used to play back the audio content or video content or selected based on the characteristics of the second location.

In some implementations, the characteristics include privacy expectations of the second user in the second location.

In some implementations, the privacy expectations of the second user are based on a type of location of the second location within the environment.

Some of the subject matter disclosed herein also includes a computer program product, comprising one or more non-transitory computer-readable media having computer program instructions stored therein, the computer program instructions being configured such that, when executed by one or more computing devices, the computer program instructions cause the one or more computing devices to: receive conversational content having audio content and video content from a first user and directed towards a second user within an environment, the first user being within a first location of the environment; determine that the second user is within a second location of the environment, the first location being different than the second location; determine devices within the second location that are capable of providing playback of the audio content and devices within the second location that are capable of providing playback of the video content of the conversational content; play back the audio content of the conversational content using the devices within the second location that are capable of providing playback of the audio content; and play back the video content of the conversational content using the devices within the second location that are capable of providing playback of the video content.

In some implementations, determining that the second user is within the second location is based on one or both of audio recognition or visual recognition.

In some implementations, the computer program instructions cause the one or more computing devices to: predict that the second user will move from the second location to a third location within the environment, the third location being different than the first location or the second location; determine devices within the third location that are capable of playback of the audio content of the conversational content; and play back the audio content using the devices within the third location that are capable of providing playback of the audio content.

In some implementations, the computer program instructions cause the one or more computing devices to: determine that the second user is moving from the second location to the third location; and adjust volume of the playback of the audio content within the second location and the third location based on the determination that the second user is moving from the second location to the third location.

In some implementations, adjusting the volume of the playback includes adjusting the volume such that the volume of the playback of the audio content within the third location increases and the volume of the playback of the audio content within the second location decreases as the second user moves from the second location to the third location.

In some implementations, the computer program instructions cause the one or more computing devices to: determine characteristics of the second location corresponding to the second user, wherein the devices used to play back the audio content or video content or selected based on the characteristics of the second location.

In some implementations, the characteristics include privacy expectations of the second user in the second location.

In some implementations, the privacy expectations of the second user are based on a type of location of the second location within the environment.

Some of the subject matter disclosed herein also includes an electronic device, comprising: one or more processors; and memory storing instructions, wherein the processor is configured to execute the instructions such that the processor and memory are configured to: receive conversational content having audio content and video content from a first user and directed towards a second user within an environment, the first user being within a first location of the environment; determine that the second user is within a second location of the environment, the first location being different than the second location; determine devices within the second location that are capable of providing playback of the audio content and devices within the second location that are capable of providing playback of the video content of the conversational content; play back the audio content of the conversational content using the devices within the second location that are capable of providing playback of the audio content; and play back the video content of the conversational content using the devices within the second location that are capable of providing playback of the video content.

In some implementations, determining that the second user is within the second location is based on one or both of audio recognition or visual recognition.

In some implementations, wherein the processor is configured to execute the instructions such that the processor and memory are configured to predict that the second user will move from the second location to a third location within the environment, the third location being different than the first location or the second location; determine devices within the third location that are capable of playback of the audio content of the conversational content; and play back the audio content using the devices within the third location that are capable of providing playback of the audio content.

In some implementations, wherein the processor is configured to execute the instructions such that the processor and memory are configured to determine that the second user is moving from the second location to the third location; and adjust volume of the playback of the audio content within the second location and the third location based on the determination that the second user is moving from the second location to the third location.

In some implementations, adjusting the volume of the playback includes adjusting the volume such that the volume of the playback of the audio content within the third location increases and the volume of the playback of the audio content within the second location decreases as the second user moves from the second location to the third location.

In some implementations, wherein the processor is configured to execute the instructions such that the processor and memory are configured to determine characteristics of the second location corresponding to the second user, wherein the devices used to play back the audio content or video content or selected based on the characteristics of the second location.

In some implementations, the characteristics include privacy expectations of the second user in the second location.

In some implementations, the privacy expectations of the second user are based on a type of location of the second location within the environment.

DETAILED DESCRIPTION

This disclosure describes devices and techniques for managing services in an environment with connected devices. In one example, a user can use a mobile phone to have a conversation with others by communicating over a communication link established with a cellular network outside of a home. The communication link can include audio content (e.g., speech of the conversation) transmitted and received by the mobile phone. Eventually, the user can return to the home while still engaged in the conversation on the mobile phone. An assistant device in the home can determine that the user is having a conversation on the mobile phone and then establish another communication link for the conversation using the devices within a wireless network of the home. For example, the conversation can be shifted to using a communication link using a local wireless network established within the physical space of the home rather than the cellular network. Additionally, the new communication link can provide video as well as the audio by using camera devices within the home. Thus, the devices within the home such as televisions, speakers, etc. can be used to facilitate the conversation by providing resources such as display screens, speakers, microphones, etc. that can be coordinated with or by the assistant device. As a result, communications can be seamlessly shifted to take advantage of the connected environment.

In a second example, a user can subscribe to several services (e.g., music services providing playback of music, video services providing playback of video content, etc.). The home's connected environment can include several devices (e.g., speakers, televisions, etc.) that can play back the music and video content. An assistant device can manage the playback of the content from the different services on the devices in the connected environment.

In another example, this disclosure also describes devices and techniques for managing conversations using devices within the environment. In one example, users can be in different locations within a home (e.g., one user in a living room and another user in a bedroom). The users can communicate with each other using the devices determined to be in their respective locations. For example, the locations of the users can be determined by an assistant device, other devices within those locations that can be used to facilitate a conversation can be identified, and playback of conversational content such as video and/or audio can be provided using the identified devices. The devices can be communicatively coupled with the home's wireless network. Thus, an intercom system can be enabled using the devices within the home and managed by the assistant device.

Figure 1:
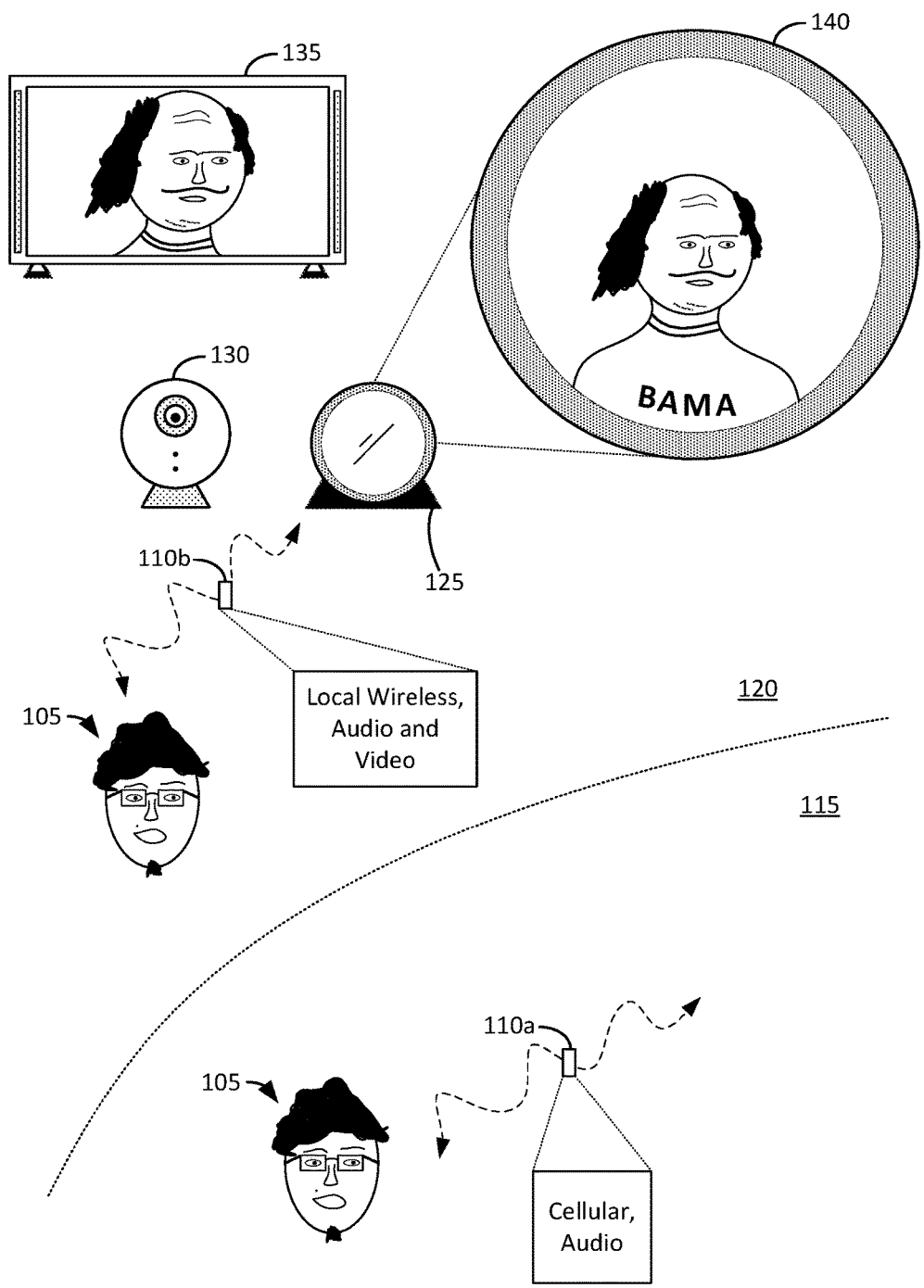
FIG. 1 illustrates an example of an assistant device transferring communications among devices.

In more detail, FIG. 1 illustrates an example of an assistant device transferring communications among devices. In FIG. 1, user 105 can be outside 115 of a home connected environment 120 (i.e., outside of the range of the home's wireless network, such as a wireless local area network (WLAN) implementing one of the IEEE 802.11 standards as provided by a router within the home, a personal area network (PAN) implemented with Bluetooth®, etc.). User 105 can use a mobile phone to make a phone call to have a conversation with someone else. Therefore, the mobile phone can establish communication 110a, which can include a communication link established over a cellular network (e.g., GSM, LTE, etc.). Due to the bandwidth limitations of the cellular network, communication 110a can be limited to audio content (e.g., speech of the participants of the conversation).

Eventually, user 105 can return to his home while still having the conversation on his mobile phone over communication 110a (i.e., the cellular communication link providing audio content). In home connected environment 120, assistant device 125 can determine that user 105 is having a conversation with his mobile phone, and transfer the conversation to be over communication 110b, which can be a communication link using the wireless network (e.g., WLAN) of home connected environment 120 and include audio as well as video content. That is, assistant device 125 can seamlessly transfer the conversation from the mobile phone using communication 110a of a cellular network to communication 110b of a WLAN so that user 105 can continue the conversation using the additional devices within home connected environment 125. For example, assistant device 125 can use the WLAN to establish the conversation using the Internet and direct content of the conversation using the WLAN to other devices within home connected environment 120, such as televisions, speakers, etc. These other devices can have resources such as display screens, microphones, speakers, cameras, etc. that can be used for the playback of content of the conversation (e.g., speech of another participant) or provide content for the conversation (e.g., the speech of user 105). This can occur because the mobile phone and assistant device 125 might have several radios for wireless communications that are configured to operate within different frequency ranges of the electromagnetic spectrum. One radio of the mobile phone might operate at the frequency range for communication 110a (e.g., 824-849 Megahertz (MHz), 869-894 MHz, etc. as used for some cellular communications) and another radio (or radios) of assistant device 125 and other devices within the environment might operate at the frequency range for communication 110b (e.g., 2.4-2.5 Gigahertz (GHz), 4.915-5.825, etc. as used for some IEEE 802.11 communications). Thus, the conversation can be switched from being transmitted and received via communication 110a using one radio to communication 110b using a second radio that operates in a different frequency range.

Additionally, the content of the conversation can be expanded to include video content because of the availability of video recording devices in home connected environment 120 and the increased bandwidth of communication 110b. For example, the local wireless network usually has higher bandwidth (e.g., can upload or download more data) than a cellular network. This can allow for the former audio-only conversation to turn into a video chat conversation including both video and audio content.

Assistant device 125 can include an intelligent home assistant responding (e.g., providing content, interacting with other devices, etc.) to voice input of user 105 as well as recognizing situations arising without the direct input of user 105. For example, as user 105 enters home connected environment 125, assistant device 125 can determine that user 105 has returned home and is having a conversation using communication 110a that can be switched to communication 110b. In some implementations, assistant device 125 can determine that user 105 is having the conversation using communication 110a because it can communicate with user 105's mobile phone and receive data indicating that the conversation is ongoing over the cellular network. In another implementation, assistant device 125 can include a microphone (or microphone array) to detect that user 105 is having a conversation on a mobile phone, for example, using voice recognition. In another implementation, assistant device 125 can use the local resources within home connected environment 120 to determine that the conversation is ongoing. For example, camera 130 can be connected (e.g., communicatively coupled) with the WLAN and assistant device 125 can receive video data from camera 130 (e.g., camera 130 can generate image frames of the environment including image content portraying user 105 speaking on the mobile phone) and determine that user 105 is having the conversation based on the video data and/or audio data using image and voice recognition, respectively. In some implementations, assistant device 125 can include an integrated camera.

Once assistant device 125 has determined that user 105 is having a conversation on a mobile phone using communication 110a, the local resources of home connected environment 120 can be utilized. For example, assistant device 125 can have a record (or determine) the available local resources and use the capabilities of those local resources to provide content related to the conversation. In one example, as devices including display screens, speakers, microphones, or other functionality that can be used to facilitate conversations connect with the home's wireless network, assistant device 125 itself can be connected to the same wireless network and determine that a new device has connected, and determine the capabilities of that new device (e.g., the device includes a display screen and speakers so that video and audio data can be played back with it). In some implementations, user 105 can indicate (e.g., by selecting preferences to be associated with a user profile that can be looked up by assistant device 125 upon recognizing user 105 is engaged in a conversation) which devices (i.e., which local resources) of home connected environment should be used in the techniques disclosed herein.

In FIG. 1, assistant device 125 can provide video content representing the other participant in the conversation on television 135 or on display screen 140 of assistant device 125. For example, if the other participant has a video camera available, then that video camera can provide video content. Additionally, video data of user 105 can be provided to the other participant in the conversation using camera 130. As such, the local resources available within the home's connected environment can be used to continue the conversation.

In some implementations, as user 105 walks throughout the rooms of the home, his location can be detected in that room by assistant device 125 using cameras, sound recognition, etc. Assistant device 125 can determine the local resources within that room (e.g., checking which devices are activated or turned on, accessing memory storing data indicating the devices in that room, etc.) and provide the video and audio data to the appropriate devices in that room upon determining that the user is there. If user 105 walks into another room, the local resources within that other room can be provided the video and audio data. The video and audio data can no longer be provided to the devices in the first room to reduce the bandwidth usage of the WLAN of home connected environment 140 so that the conversation can continue seamlessly.

In some implementations, user 105 can still hold the conversation on the mobile phone even as the conversation switches to communication 110b. If user 105 puts down the mobile phone (e.g., as detected using camera 130), then the conversation can cease to be provided by it, but the other devices in the home connected environment 120 can maintain the conversation.

In some implementations, the context (or characteristics) of the connected environment, characteristics of the conversation or other participants of the conversation, or characteristics of users can be determined and those context and/or characteristics can be used to determine whether to transfer the conversation, which devices should be used to provide content for the transferred conversation, or what type of content to include in the transferred conversation.

For example, assistant device 125 can identify whether other people are within the connected environment using camera 130 (for visual identification) or its microphone (for audio identification). Some examples of visual recognition algorithms include classification algorithms, clustering algorithms, ensemble learning algorithms, Bayesian networks, Markov random fields, Multilinear subspace learning algorithms, real-valued sequence labeling algorithms, and/or regression algorithm. If so, user 105 might not want the conversation to switch from communication 110a to communication 110b to maintain some privacy. As a result, assistant device 125 can let the conversation remain with communication 110a. If user 105 is alone within the home, then the conversation can switch to communication 110b. Thus, the presence of others in the environment can be identified and used to determine whether to switch the conversation from communication 110a to communication 110b.

In some implementations, the person that user 105 is having the conversation with can be identified and based on that person's identity, it can be determined whether to transfer the conversation to use the local resources of the connected environment or the type of content for the transferred conversation. For example, family and friends can be identified as the type of people that user 105 might want to have a video conference with. By contrast, strangers or co-workers might be identified as the type of people that user 105 might want to keep to audio conversations rather than video chats. As a result, when the conversation is switched to communication 110b, and the other participants of the conversation include family or friends, then the conversation can be a video chat by having communication 110b provide both audio and video content. By contrast, if the other participants include strangers or co-workers, then the conversation switched to communication 110b can only include audio content.

The other participants of the conversation with user 105 can be determined by assistant device 125 obtaining such information from the mobile phone, audio recognition, etc. For example, the mobile phone can indicate to assistant device 125 who the conversation is with by providing a name, the phone number of the other participant in the conversation, etc. If provided the phone number or name, then assistant device 125 can access other resources, such as a social media account, cloud-based contact books or address books, or even its own resources storing contact information of people to determine the type of relationship that user 105 has with the other participant of the conversation (i.e., the type of participant, such as co-worker, family, friend, stranger, etc.). Thus, in an example, if a co-worker is identified as someone in the conversation, then the conversation can be maintained with communication 110*a* rather than switching to communication 110*b*. In another example, if a co-worker is identified as someone in the conversation, then the conversation can be switched to communication 110*b*, but video content can be excluded (i.e., the conversation is kept to audio).

The time of the conversation can be used to determine whether to establish communication 110*b*. For example, if user 105 is arriving at home in the evening, then the conversation can be maintained on communication 110*a* (e.g., cellular) rather than switching to communication 110*b* (e.g., using the WLAN). By contrast, if user 105 arrives in the daytime, then the conversation can be switched from communication 110*a* to communication 110*b*. In some implementations, the conversation can be switched from communication 110*a* to communication 110*b*, but the type of content to include in communication 110*b* can be based on the time of the conversation. For example, in the evening, communication 110*b* might only include audio content. However, in the daytime, communication 110*b* might include both audio and video content of the conversation.

Different users can be identified and those different users might have assistant device 125 set up differently to manage the switch from communication 110*a* to communication 110*b*. For example, users can establish a profile indicating the situations in which a conversation should be switched to communication 110*b*. In some implementations, assistant device 125 can use a variety of machine learning algorithms to determine over time how the users would want to switch conversations.

How the user is engaged or acting within the conversation can be determined and used to determine whether to switch the conversation to communication 110*b*, or the types of content (e.g., audio, video) that should be established for the conversation. For example, the volume of the speech of user 105 engaged in the conversation or the speech of the other participants in the conversation can be determined using the microphone of assistant device 125 or data regarding the volume can be obtained by assistant device 125 from the mobile phone. If that volume is above a threshold volume level or within a high volume range (e.g., at a high volume), then this can indicate that the conversation might not include sensitive or private information being discussed and, therefore, the conversation can be switched to communication 110*b* and also include video content as well as audio content. However, if that volume is below the threshold volume level or within a low volume range (e.g., at a low volume), then this might indicate that the conversation is relatively sensitive or includes private information being discussed. User 105 might not want the conversation to be switched to communication 110*b*. Thus, assistant device 125 can refrain from doing so.

The physical movements of user 105 can also be determined and used in similar ways. For example, if user 105 is determined to be moving relatively fast (e.g., at a speed within a speed range corresponding to a high speed as detected by an analysis of several image frames generated by camera 130), then user 105 might not want to be disturbed with having to switch attention from his mobile phone to the other resources when the conversation is switched to communication 110*b*, or might want the conversation to be switched to communication 110*b* but only include audio content so that the user does not have to look at a display screen. Thus, the conversation can be switched accordingly (e.g., switch to communication 110*b* but not include video content based on the user's physical movements). In another example, user 105 might be engaged in some activities (e.g., eating) and if detected to be engaged in that activity (e.g., using camera 130 and image recognition techniques), then the conversation can be maintained using communication 110*a*, or switched to communication 110*b* but without video content so that the other participants in the conversation cannot see that user 105 is engaged in that activity.

The physical appearance of user 105 or other participants within the conversation can also be determined and used in a similar manner. For example, if user 105 recently woke up from sleep, returns from a long night out, etc. then he might not want the conversation to switch to communication 110*b* and include video content because he might have unkempt hair, be clothed in pajamas, etc. Thus, the physical characteristics of user 105 can be determined and the conversation can be maintained on communication 110*a*, or switched to communication 110*b* but only include audio content (i.e., no video content) based on the characteristics such as physical appearance of user 105.

Similarities between user 105 and other participants within the conversation can be determined. For example, in FIG. 1, within home connected environment 120, the conversation can be switched to communication 110*b* and be expanded to include video content, as previously discussed. This can occur if one or both user 105 and the other participant have access to cameras such as camera 130. In some implementations, image frames of both users can be generated using the cameras and analyzed and if there are similarities between the users, then the conversation can be switched to communication 110*b*, or be switched to communication 110*b* and include video content. For example, if both user 105 and the other participant are wearing sweatshirts with text written upon them (e.g., a university name, company name, etc.), then the textual content can be recognized as existing within the image frames, extracted, and analyzed. If there are similarities between the text in the different image frames corresponding to user 105 and the other participant, such as both having sweatshirts with the same university name, then communication 110*b* can include video content. This might be done because user 105 and the other participant are likely to know each other due to wearing the same sweatshirt. Other textual content, such as text on diplomas on walls, text on identification badges worn on users, etc. can also be used. Lack of similarity can result in no video content being provided. In some implementations, similar visual content other than textual content can also be used. For example, if both users both have the same sculpture (or same assistant device, same mug, etc.) on both of their desks and the sculpture is visible by cameras, then this can be used in a similar manner as similar textual content. Thus, an object can be recognized within the image frames portraying user 105 and the other participant and the recognition of the presence of that object can result in increased functionality for the conversation (e.g., provide video content).

The similarities between user 105 and other participants can also include similarities between their physical characteristics. For example, various measurements of facial characteristics (e.g., space between eyes, size of nose, shapes of facial features, etc.) can be measured and a score can be generated indicative of the similarities between user 105 and the participants within the conversation. Relatives might have a higher score than strangers. Thus, if the other participant in the conversation has a score representative of a relative, then communication 110*b* can include video content, or the conversation can be switched from communication 110*a* to communication 110*b*.

Sometimes, user 105 might wander around his home. For example, user 105 might enter his residence through the front door and into the living room. The conversation can be switched from communication 110a to communication 110b. Because the living room has television 135 and camera 130, the conversation can be expanded to include visual content. However, eventually user 105 might enter his bedroom and that bedroom might have another camera (e.g., a web camera for his computer). However, user 105 might consider his bedroom to be a more private or sensitive place than the living room. Thus, assistant device 125 can determine that user 105 has left the living room and entered a more private or sensitive room (i.e., the bedroom), and may then alter the conversation using communication 110b such that it no longer provides video content. The other participants of the conversation can then still be able to communicate with user 105, but only through audio rather than both audio and video. When user 105 returns to the living room, the video content can be restored. As a result, the location of user 105 within home connected environment 120 can be determined and that location can be used to determine what type of content to allow for the conversation.

In some implementations, the determination of whether certain locations are more private or sensitive can be determined by learning user behaviors, or identifying objects or devices within those locations. For example, user 105 can be heard to be snoring in a location, and this can be correlated with being from a bedroom. Thus, the recognition of certain sounds might be determined to be from a location such as a bedroom, which can be classified as a private or sensitive location. These determinations can also be made with visual determinations (e.g., recognizing night stands, alarm clocks, etc. that typically go in a bedroom) and the privacy or sensitivity determinations can be stored in a table of a database and accessed by assistant deice 125.

The content of the conversation between user 105 and the other participants can also be determined. For example, the topics being discussed, sounds in the background, etc. can be determined. If there is a lot of background noise including other speech (e.g., in a restaurant), then this can indicate that the other participant might be difficult to hear and, therefore, the conversation can be switched from communication 110a to communication 110b so that the conversation can be played back using the speakers of other local resources that might be louder and easier to understand than the speaker of the mobile device. The topics being discussed can also be determined, for example, if sensitive or private information are being discussed then communication 110a can be maintained (i.e., the conversation is not switched to communication 110b). In some implementations, assistant device 125 can store a dictionary of key words representative of sensitive or private topics. Assistant device 125 can recognize whether user 105 says one of those words, or if a participant in the conversation says one of those words, and then maintain communication 110a, switch the conversation to only include audio content or only video content, etc.

In some implementations, user 105 can maintain a calendar of his schedule. For example, user 105 can maintain a calendar on his mobile phone, on a computer, on a cloud service, etc. Assistant device 125 can access the user's calendar and obtain records of the meetings that user 105 has recorded. If the conversation is determined to be occurring at the time of one of those recorded meetings, then this can mean that this is an expected call and, therefore, the conversation can be switched to communication 110b and use both audio and visual content.

In some implementations, the conversation can remain with communication 110a even when user 105 enters home connected environment 120. However, upon the battery level (representative the current charge available of the battery) of the mobile device transitioning below a certain threshold (e.g., in a range corresponding to a low battery level such as 30% battery charge remaining), then the conversation can be switched to communication 110b. Thus, the local resources can be used when the battery of the mobile phone might be reaching a state when it can no longer provide communications. This can provide continuity to the conversation such that user 105 does not have to redial the other participant.

In some implementations, the signal strength for communication 110a can be determined and if it is beneath a threshold signal strength (e.g., in a range corresponding to a low signal strength) then the conversation can be established using communication 110b, as discussed herein.

In some implementations, user 105 can provide physical movements representing a gesture as an indication that the conversation should be switched to communication 110b. For example, the user can wave his hand at or point to assistant device 125. This can be recognized using camera 130, and then communication 110b can be established for the conversation.

In some implementations, user 105 might call a customer support line via communication 110a. User 105 might be "on hold" waiting for a live human customer support representative to assist with a problem, or might be navigating through an automated or interactive voice response system. When user 105 enters home connected environment 120, he might not want to dedicate many of his local resources to the conversation. Thus, assistant device 125 can determine that the call did not begin with a live, human participant (e.g., this can be recorded by the mobile phone and then obtained by assistant device 125) and, therefore, maintain communication 110a for the conversation, or switch the conversation to communication 110b but not include video content or only use some (i.e., not all) of the available devices within the connected environment of the home.

In some implementations, how long (e.g., duration in time) user 105 has been engaged within the conversation can also be determined and used in similar ways. If user 105 has been having the conversation for a threshold time period, then the conversation can be switched to communication 110b. For example, if user 105 has been having the conversation for an hour, then the conversation can switch to communication 110b from communication 110a. This can be helpful because it can be tiring to hold the mobile phone for a long period of time. By seamlessly switching from communication 110a to communication 110b, user 105 can maintain a longer conversation before getting too tired. In some implementations, the time period before switching can be set by the user, for example, indicated in preferences and stored with a profile for user 105. In some implementations, the time period can be variable based on any of the characteristics discussed herein. For example, the time period can be made longer or shorter in time duration if other people are detected within home connected environment 120.

In some implementations, how much of the conversation is the speech of user 105 can be determined and used to switch the conversation from communication 110a to communication 110b, or to determine whether to include video content with communication 110b. For example, assistant device 125 can listen to user 105 and if he has spoken for 20% of the conversation and the other participant has provided 80% of the speech spoken of the conversation (or speaking for 80% of the time of the conversation) then this might not be a conversation in which user 105 is as engaged in and, therefore, communication 110b might be limited to audio content. In another implementations, this might result in maintaining the conversation with communication 110a so that user 105 can use his local resources without having them used to provide audio or video content for the conversation.

Figure 2:
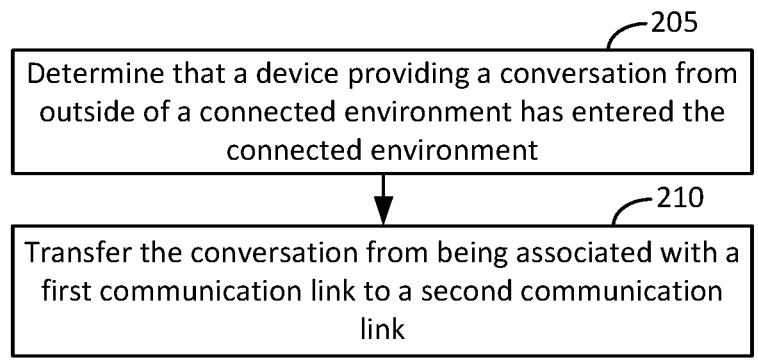
FIG. 2 illustrates an example of a block diagram for transferring communications among devices.

FIG. 2 illustrates an example of a block diagram for transferring a communications service among devices. In FIG. 2, at block 205 an assistant device can determine that a device providing a conversation from outside of a connected environment has entered the connected environment. For example, in FIG. 1, the mobile device of user 105 can be detected as entering the range of the WLAN, or wireless network, of home connected environment 120 (e.g., as provided by a router and/or access point to allow access to the Internet) and within the home. The mobile device can currently be using communication 110a for a conversation.

At block 210, the conversation can be transferred from a first communication link to a second communication link. For example, in FIG. 1, the conversation can be transferred from communication 110a using a cellular network to have an audio conversation to communication 110b using the wireless network of home connected environment 120 to have the conversation including both audio and video.

Figure 3:
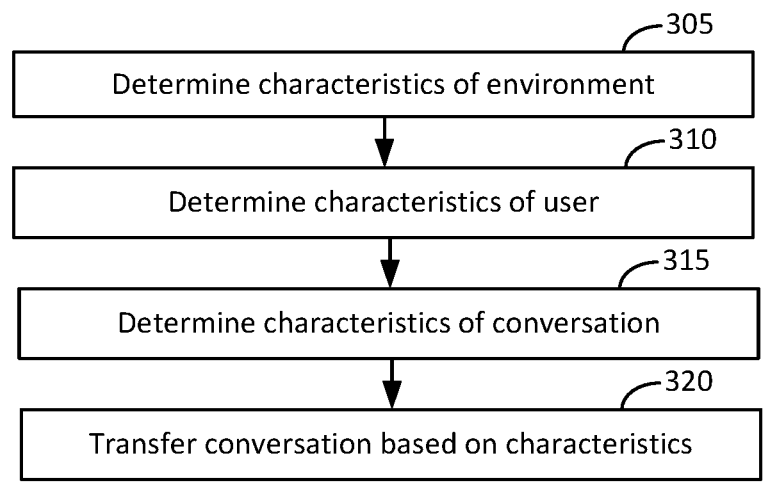
FIG. 3 illustrates an example of a block diagram for transferring communications based on characteristics of the environment, conversation, or user.

FIG. 3 illustrates an example of a block diagram for transferring communications based on characteristics of the environment, conversation, or user. As previously discussed, the context (or characteristics) of the connected environment, characteristics of the conversation or other participants of the conversation, or characteristics of users can be determined and those context and/or characteristics can be used to determine whether to transfer the conversation, which devices should be used to provide content for the transferred conversation, or what type of content to include in the transferred conversation. In FIG. 3, at block 305, characteristics of the environment can be determined. For example, the time, the people other than the user engaged in the conversation within the environment, etc. as discussed above can be determined. At block 310, characteristics of the user can be identified. For example, the user's physical movements, physical appearance, and location within the environment, etc. as discussed above can be determined. At block 315, characteristics of the conversation can be determined. For example, the other participants in the conversation, the type of relationship of the user with the other participants, the volume of speech, content of speech, etc. as discussed above can be determined. At block 320, the conversation can be transferred based on the characteristics. For example, the conversation can be transferred from using communication 110a to communication 110b in FIG. 1.

Figure 4:
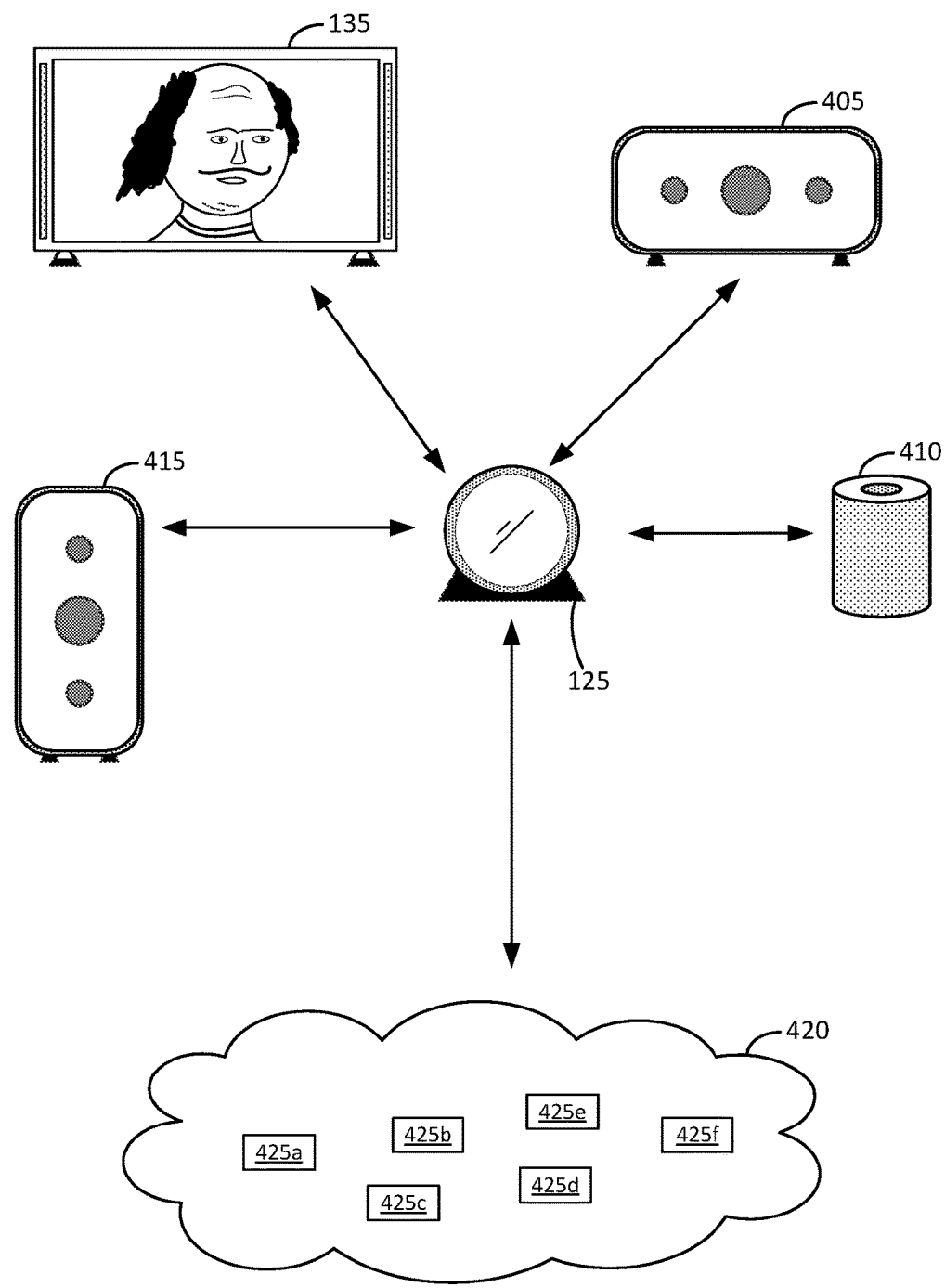
FIG. 4 illustrates an example of an assistant device managing playback of services among devices.

Assistant device 125 can also manage playback of other types of content other than conversations. FIG. 4 illustrates an example of an assistant device managing playback of services among devices. In FIG. 4, assistant device can access services 425a-f (e.g., accessed via Internet 420) and provide content from those services onto television 135, speaker 405, subwoofer 405, and speaker 415.

For example, in FIG. 4, services 425a-c can be Internet-based streaming music services. Services 425e and 425d can be streaming video services. Service 425f can be a cloud-based image or photo repository. Assistant device 125 can include details and functionality regarding how to access services 425a-f (e.g., usernames, passwords, software, etc.) and receive content data from services 425a-f to provide to one or more of television 135, speaker 405, subwoofer 410, or speaker 415 for playback.

For example, assistant device 125 can select service 425a to stream music in the connected environment. This can include assistant device 125 determining which devices to provide the music from service 425a. For example, assistant device 125 can store data representing how user 105 might want to play back content from services 425a-f and the devices that content should be played back on. Content from different services 425a-f can be played back on different devices. For example, the music from service 425a can be played back on speaker 405 and subwoofer 410. If service 425b is selected, then the music from that service can be played back on speaker 405, subwoofer 410, and speaker 415. That is, the content from different services can be played back on different devices even if the type of content is the same (e.g., music).

Different users can have different preferences. Assistant device 125 can store these preferences and then determine which devices in the connected environment should be provided the content data for playback. For example, one group of users might want to play back music on speaker 405 and subwoofer 410. However, another group of users might want to play back music on speaker, 405, speaker 415, and subwoofer 410. As a result, assistant device 125 can play back music from services 425a-c on different devices based on the users requesting the playback. In some implementations, if assistant device 125 detects users from different groups within the connected environment (e.g., one user from the first group wanting playback of music on speaker 405 and subwoofer 410, and a second user from the latter group wanting playback of music on speaker 405, speaker 415, and subwoofer 410), then assistant device can prioritize one group of the other and play back the music using that prioritized group's preferences. In some implementations, the playback can be performed on devices that were determined by assistant device 125 to be common to the groups. In some implementations, assistant device 125 might play back the music on an intermediate number of devices in between the number of devices specified by the different groups. For example, if one group of users wants to play back music on three devices, but another group of users wants to play back music of five devices, then four devices can be selected for playback. In some implementations, the playback preferences of the group with the highest number of users detected can be selected by assistant device 125.

As another example, if video from services 425e and 425d are to be played back within the connected environment, then the video and audio content of both can be played back on television 135. However, assistant device 125 might also play back the audio on subwoofer 410 when streaming video from service 425e. When streaming service 425d, subwoofer 410 might not be used.

In some implementations, assistant device 125 can analyze the content being provided by services 425a-f and then select the devices to be used to play back the content from the service. For example, assistant device can determine that an action movie with loud explosions is streaming from service 425d for play back on television 135. The playback experience can be improved by also providing audio data to subwoofer 410 so that the loud explosions have a more immersive experience. By contrast, if a drama movie is streaming for playback on television 135, then speakers 405 and 415 can be provided audio data, but subwoofer 410 can be left out of the playback experience.

In some implementations, assistant device 125 can determine the context of the environment of the home's connected environment and select devices for playback of content based on the determined context. For example, if assistant device 125 detects that a number of people in a room are above a threshold number, then more devices can be provided audio data. This can be done because many people in a room talking at once might result in the playback of audio (e.g., music) needing to be louder and from more devices. In some implementations, the volume (e.g., how loud) of the people in a room or other noises in the room can also be determined and used to adjust which devices are provided playback, the number of devices are provided playback, the volume of the devices playing back content, etc.

Figure 5:
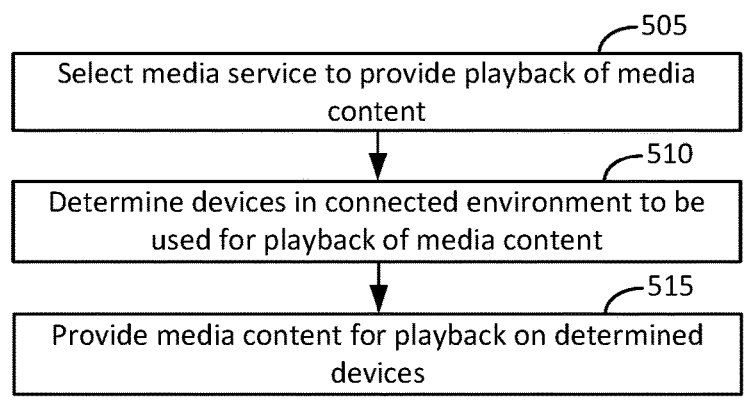
FIG. 5 illustrates an example of an assistant device managing playback of services among devices.

FIG. 5 illustrates an example of an assistant device managing playback of services among devices. In FIG. 5, at block 505, a media service can be selected to provide playback of content. For example, in FIG. 4, assistant device 125 can select one of services 425a-f to receive media content such as music, video, photos, etc. for playback. At block 510, the devices in a connected environment to be provided the media content for playback can be determined. For example, assistant device 125 in FIG. 1 can select one or more of television 135, speaker 405, speaker 415, and subwoofer 410 for playback of the media content. At block 515, the media content can be provided to the determined devices for playback. For example, in FIG. 4, assistant device 125 can provide music data to speaker 405 and subwoofer 410 for playback of the music from service 425a.

Figure 7:
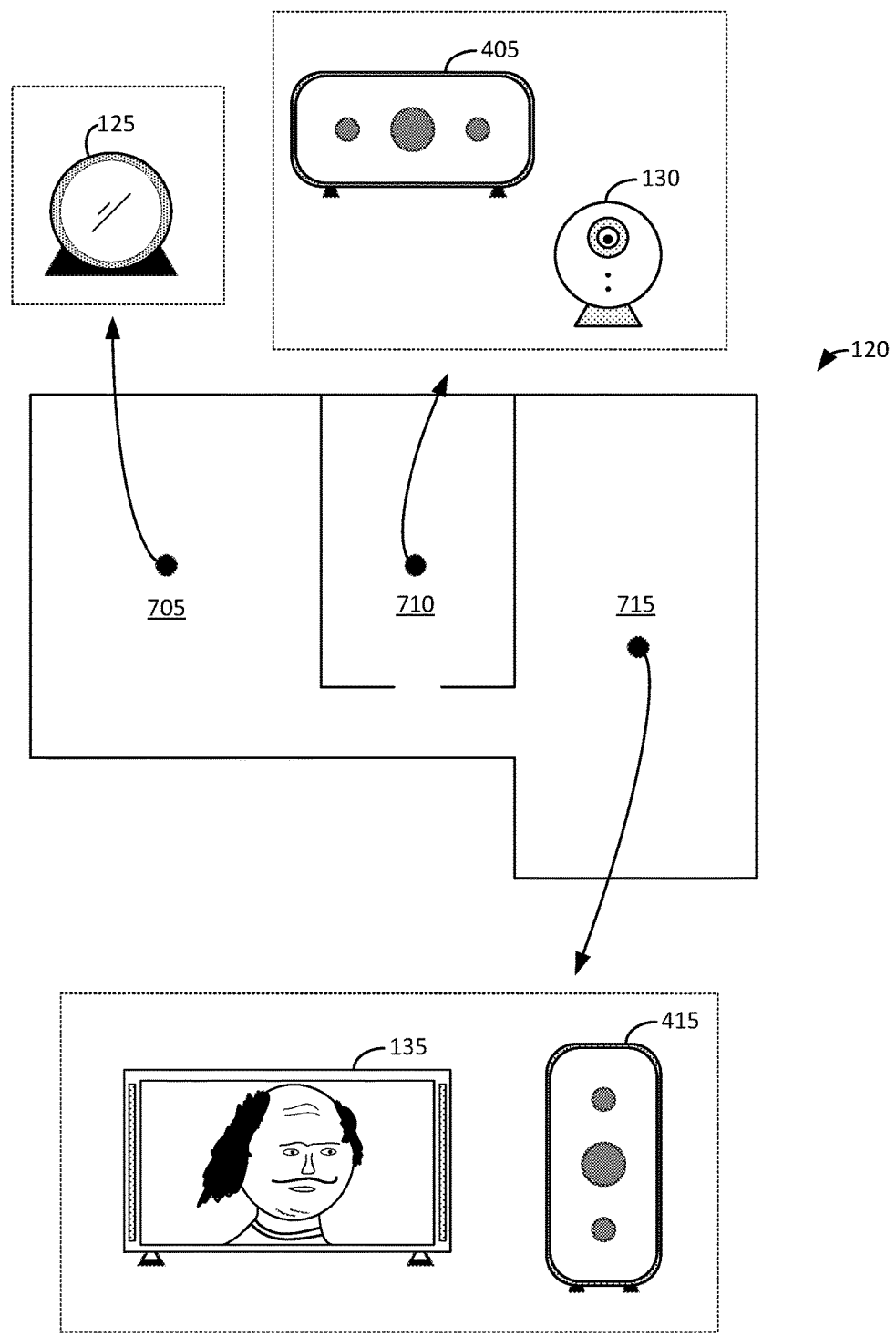
FIG. 7 illustrates an example of an assistant device managing conversations using devices within the environment.

Any of the techniques described herein can also be used to communicate with others in the connected environment rather than transferring a conversation. For example, the techniques described above can be used to manage a conversation between different users within the connected environment, effectively providing an intercom type of system within the home environment. FIG. 7 illustrates an example of an assistant device managing conversations using devices within the environment. In FIG. 7, an environment can include rooms 705, 710, and 715. Different users can be in different rooms, for example, one user can be in room 705 (e.g., a bedroom) taking a nap and another user can be within room 715 (e.g., a living room) watching television. The different rooms can include different devices. For example, in FIG. 7, room 705 can include assistant device 125. Room 710 can include speaker 405 and camera 130. Room 715 can include television 135 and speaker 415.

As previously discussed, these different devices (or local resources) can have different capabilities related to providing content related to a conversation. For example, in FIG. 7, television 135 can include a display screen and speakers to provide video and audio content, respectively, from another user (i.e., conversational content from the other user directed to a user within room 715). That is, a user in room 715 can receive a video depiction of another user on television 135 as well as receive audio content of what the other user is speaking via television 135. Speaker 415 can also provide audio content from the other user. In room 710, speaker 405 can provide audio content (e.g., play back audio conversational content from another user) and camera 130 can provide or record video content and audio content occurring within room 710 from the user that can be provided to the other user outside of room 710. In room 705, assistant device 125 can provide video and audio content from another user for a conversation to the user within room 705. Additionally, assistant device 125 can provide video content (via a camera) and audio (via a microphone) content from the user within room 705 to a user in one of rooms 710 and 715. All of these devices can be communicatively coupled with assistant device 125 via the wireless network of home connected environment 120.

Assistant device 125 determine which room another user is in to "page" or provide communications from one user to that other user. That is, rather than switching a conversation from one communications link to another communications link as previously discussed, assistant device 125 can initiate a conversation using a communication link (e.g., the home's WLAN) among different locations within the home environment For example, if a first user is within room 705 and a second user is within room 710, then assistant device 125 can allow for those two users to participate in a conversation using the devices in rooms 705 and 710. For example, assistant device 125 can determine which room that the second user is within (e.g., room 710) and then determine the devices in that room that can be used to play back video and audio content from the user within room 705, as well as the devices within room 710 that can be used to provide audio and video content for the portion of the conversation provided by the second user within room 710.

Assistant device 125 can determine the room that the second user is within via a variety of techniques. For example, assistant device 125 can receive video input from other devices within the home and be able to visually determine that the user has entered room 710. Thus, image frames of the user walking towards and/or into room 710 can be received by assistant device 125 and analyzed to determine that the user has entered room 710 within home environment 120. Other techniques such as sound or audio recognition can also be performed. For example, noises of the second user walking to room 710 such as footsteps, floors creaking, doors opening, or other environmental sounds related to the user's movement can be determined and analyzed.

Some of these noises can be picked up via the microphones of assistant device 125. Other noises can be provided by other devices within the environment. For example, microphones of other devices in room 705 as well as rooms 710 and 715 can provide audio data to assistant device 125. Thus, as the second user walks around home environment 120, image and audio data related to the user's movements can be received by assistant device 125. Assistant device 125 can then determine that the second user is within room 710 based on the image and/or audio data.

When the second user is determined to be in a particular location such as room 710, then assistant device 125 can determine the devices within that location and the capabilities of those devices. Devices that can be used to facilitate the conversation between the users (e.g., provide the first user's speech and/or visual depiction to the devices within the location of the second user, and vice versa) can then be determined. For example, as previously discussed, assistant device 125 can determine the local resources within that room (e.g., checking which devices are activated or turned on, accessing memory storing data indicating the devices in that room, etc.) and provide the video and audio data to the appropriate devices in that room upon determining that the user is there. Thus, assistant device 125 can determine that the second user is within 710 and that the first user is within room 705. Assistant device 125 can determine the devices within those two rooms that can be used to facilitate the conversation (e.g., provide the audio and video content of the conversation), and then provide the corresponding playback on those devices.

In some implementations, the second user can be expected to move to another location within home environment 120. For example, the second user can initially be in room 710 and the conversational content with the first user in room 705 can be played back with devices identified within room 710. However, the second user might eventually move over to room 715. Thus, in some implementations, assistant device 125 can determine that the second user has moved to room 715, for example, because camera 130 can be used to determine that the second user has left the room and then audio input received by devices within 715 can be used to determine that the second user is now within room 715. The playback of the conversational content can then switch from the devices within room 710 to the devices within room 715.

The movement of the second user from room 710 to room 715 can also be predicted and the playback of the conversational content can be managed based on the prediction. For example, if the second user is in room 710 and turns off a light switch, turns off a lamp, turns of a television, etc. then the second user might be expected to move on to another room. Based on the second user's profile, a variety of usage patterns of the second user can be determined, for example, where the user spends most of the time within home connected environment 120 for the other locations (e.g., more time spent within room 715 than room 705), the time (e.g., the second user might retire to a bedroom after midnight), etc. If the second user is predicted to move on to room 715 based on the activities or usage occurring in room 710, then the conversational content can also be played back with television 135 and speaker 415 within room 715. Thus, when the second user moves from room 710 to room 715, the conversational content can be seamlessly played back without interruptions.

In some implementations, the playback of the conversational content on the devices within rooms 710 and 715 can be adjusted as the second user moves from room 710 to room 715. For example, as the second user is determined to be moving from room 710 to room 715, the playback of the audio content within room 710 can have its volume decreased while the playback of the audio content within room 715 can have its volume increased. This can allow for the second user to still be engaged with the conversation with the first user without interruption. Additionally, when the second user is within room 715, the playback of the audio content can be at a level or volume similar to the playback within room 710, resulting in a seamless transition.

Sometimes the second user might not want to participate in a conversation with the first user. For example, if the second user is sleeping in room 710, then the second user might not want to be woken up to participate in a conversation with the first user in room 705. Thus, characteristics of the location of the second user can be determined and used to determine whether to play back the audio and/or visual parts of the conversational content. For example, if the location is a bedroom and the time is after midnight, then the second user might not want to be disturbed. As a result, the first user may not be able to engage in a conversation using the devices within room 710.

In some implementations, characteristics of the second user can be determined to decide whether to have the devices play back the conversational content. For example, if the second user is determined to be sleeping (e.g., as determined using visual content such as a camera within room 710 providing image frames or audio content such as a microphone picking up audio sounds that are determined by assistant device 125 to be snoring or sleeping noises), then the conversation may not engage using devices within room 710.

In some implementations, the privacy expectations of the second user can be determined and used to determine whether to have the second user engaged in the conversation within home environment 120. For example, the activity that the second user is currently engaged in (e.g., talking to another person on a phone) can be determined. Different activities might result in a different privacy expectation of the second customer, for example, some activities that the second user is engaged in might result in that second user not wanting to be interrupted while other activities might result in that second user finding being interrupted to be acceptable while performing those activities (e.g., the activities can be determined and correlated with a score, and scores within a threshold range can be indicated as having a higher expectation of privacy than scores outside of the threshold range).

In some implementations, the characteristics of the location can be used. For example, the type of location can be determined and used to determine whether to engage in the conversation using devices within the location. For example, a bedroom might be a more private place than a living room and, therefore, a conversation might not be engaged there but engaged within a living room. In another example, the number of people within the location can be determined. If there are a number of people above a threshold number (e.g., more than just the intended recipient of the conversation, more than three people, more than ten people, etc.), then the conversation may not be engaged within that location.

Though some of the examples above describe intercom communications within the same home environment, the techniques described herein can be applied across geographically distinct locations. For example, the intercom type of functionality can be applied to different homes in different states or countries.

In some implementations, the content or nature of the conversation can be determined, as previously discussed regarding transferring conversations among communications links, and used to determine whether to have users engaged in the conversation within different locations. For example, if the first user within location 705 provides some audio content related to a particular topic, then this can be determined and if the topic is determined to be important then the second user within location 710 can be engaged.

In at least one embodiment, a user can interact with another user via their respective assistant devices located at geographically disparate environments. For example, the user in New York can use her assistant device to call a second user in San Francisco on the second user's assistant device. The communication between assistant devices can be user profile centric and/or assistant device centric. Regarding assistant device centric communications, the communication link is established by one assistant device requesting a connection to another assistant device. Regarding user profile centric communications, the communication link is established by a user associated with a user profile requesting a connection to another user associated with another user profile.

In at least one embodiment, a global user profile can be associated with one or more users and can store information regarding assistant settings, assistant devices, connected devices, and user identity information (i.e., biometric information, authentication information, etc.). The global user profile can be used to track assistant devices closest to the user at a point in time (i.e., when a user is at a friend's house next to the friend's assistant device). For example, as a user moves to different locations (i.e., New York and Madrid) the assistant devices in those locations can identify (i.e., using biometric information, audio and/or visual recognition) the user and send information to update the global user profile with information about the closest assistant device to the user. Thus when another user requests to contact the user via an assistant device by querying the database storing the global user profile, the one or more assistant devices closest to the user can be identified and this information can be used to contact the user via the closest one or more assistant device. In at least one embodiment the database including the global user profile can include profiles for all or many users of assistant devices. In other embodiments the database storing global user profile can be only limited to subgroups of all users of assistant devices such as family groups, friend groups, etc. For example each family group can be associated with a database storing a global user profile of that family group.

In at least one embodiment the assistant devices which are configured to track the location of users can be limited to only assistant devices associated with a group of users. For example, the Smith family can setup a group and include all assistant devices belonging to the family including the assistant devices in each member's home, the vacation homes, and in automobiles. The assistant devices associated with the group can be configured to track the whereabouts of the users associated with the group and update a database storing the global user profile limited to the group (i.e., Smith family). In the example, a user who is not a member of the Smith family can be prevented from accessing location about the Smith family.

The process to interact with another user can include a query to a database (in some embodiments a database storing the global user profile) to identify whether the user has permissions to contact the other user and/or the information of the other user's whereabouts. In at least one embodiment, the database having the global user profile can include information about users such as associated devices of users and/or permission settings. For example, permission settings associated with Tom allow Susie to contact his assistant device, then Susie can contact his assistant device from her assistant device. However, if permissions associated with Tom do not include permission for Susie to contact him, then Susie will not be able to contact Tom's assistant device from her assistant device. Permission settings can include information about which users are allowed to contact other users, and/or which assistant devices can contact other assistant devices. The database can also include the assistant devices associated with the user. In some embodiments, the database is dynamically updated with the assistant device closest to the user at the current time.

In at least one embodiment, the database is stored on the cloud accessible by assistant devices via the Internet or other network. The database can also be stored on the individual assistant devices. In some embodiments, the permission settings are stored on a blockchain. In some embodiments where the database of the global user profiles is limited to configured groups, the database can be stored on the assistant devices associated with the group. In some embodiments where the database is stored on a distributed network of assistant devices, the database can be stored as a distributed database. The database stored on individual assistant devices can include assistant devices which the requesting assistant device can contact and/or the assistant devices which can contact it. For example, Tom's assistant device can indicate that it has permission to contact Susie's assistant device. The permission settings to Tom's profile and/or assistant device to access Susie's assistant device and/or Susie's profile can be configured by each party. For example, Tom can send a request to Susie and/or Susie's assistant device for permission to contact Susie and/or her assistant device, and, when Susie accepts the request, the permissions could be set in the database.

In at least one embodiment, when a request to access a user and/or her assistant device is denied, an indicator can be set preventing the request from being resubmitted. For example, if Susie denies Tom's request for permission to contact her or her assistant device, Tom can be prevented from requesting permission again. In at least one embodiment, a user denying the request can be prompted as to whether future requests from the sender should be blocked. In at least one embodiment, the assistant device of the user denying the request can determine whether to block future requests from the sender by determining the user's reaction. The user's reaction can be determined using the audio and/or visual input. For example, if it is determined that the user is frustrated, angry, disturbed, or annoyed (e.g., by determining the content of the user's speech as indicating frustration such as reciting swear words, analyzing image frames depicting the user, etc.), then it can be determined that the sender should be blocked.

In an embodiment, a user can transmit a request to connect to another user's assistant device. Connecting to said another users assistant device can include transmitting audio and/or visual content to the assistant device, similar to an intercom which allows for one-way and/or two-way communication. The connection request can include information about the sender, receiver, the sender's assistant device identifier, receiver's assistant device identifier, and/or conversational content such as audio content and/or video content. In some embodiments, the sender information can be determined using audio and/or visual input from the sender's assistant device. The assistant device can analyze the visual and/or audio input to determine the identity of the sender. The identity of the sender can be determined by using biometric, audio and/or visual algorithms. In at least one embodiment, the assistant device identifier is associated with the identity of the sender and is used to determine the sender. In some embodiments, the audio and/or visual input from the sender's assistant device is used in conjunction with information about the assistant device to identify the sender. The request to connect to another user's assistant device can be sent either directly to the other user's assistant device and/or to a server having access to the database which includes permission settings.

In one embodiment, when a connection request is received, the database is queried to determine whether the sender has permission to contact the receiver. In at least one embodiment, where it is determined that the sender has permission to contact the receiver, the assistant device associated with receiver is determined. In some embodiments, the location of the receiver can be identified using audio and/or visual input from an assistant device and/or other Internet of Things (IOT) devices in the vicinity of the receiver. For example, when Susie is in her home, it is determined that she is in the vicinity of her home assistant device; however, when Susie is at work it can be determined that she is in the vicinity of her work assistant device. In some embodiments, information about a user as a user moves between assistant devices is stored; that information includes the assistant device which is closest to set user. In some embodiments, the user's primary assistant device is stored in the database and requests are transmitted to that primary assistant device. The primary assistant device can track the whereabouts of the user. Thus, when the primary assistant device receives a connection request, the primary assistant device can forward that request to peripheral assistant devices in its environment closest to the user and/or to assistant devices closest to the user which are not in the environment of the assistant device.

Figure 8:
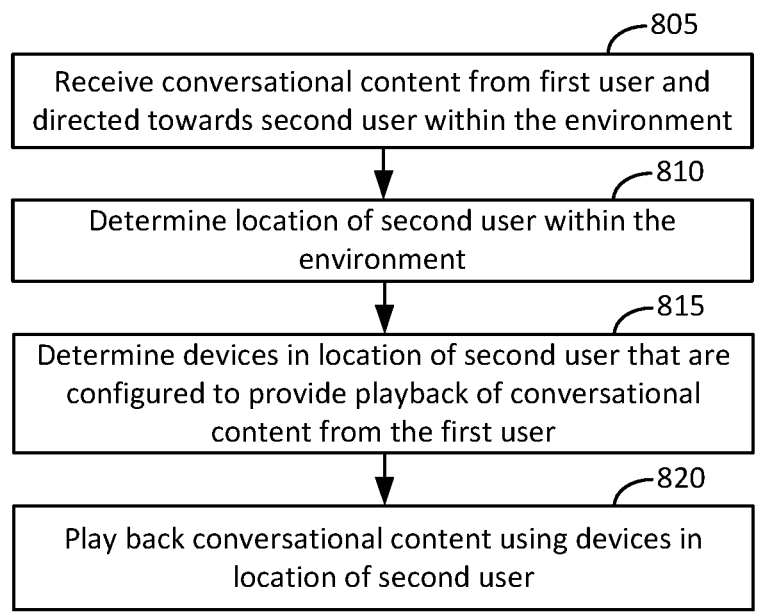
FIG. 8 illustrates an example of a block diagram for managing conversations within the environment.

FIG. 8 illustrates an example of a block diagram for managing conversations within the environment. In FIG. 8, conversational content can be received from a first user and directed towards a second user within the environment (805). For example, the first user can be in room 705 and ask assistant device 125 to inform the second user that dinner is ready. Assistant device 125 can determine that the message is directed to the second user (e.g., via voice recognition and analyzing the content of the speech provided by the first user) and then determine the location of the second user within the environment (810). For example, the second user might be in room 710. Assistant device 125 can then determine devices in the second location that are configured to provide playback of conversational content from the first user (815). For example, devices with microphones, speakers, display screens, cameras, and other features or functionalities of devices can be determined. The conversational content received from the first user can then be played back on those devices in the second location (820).

Many of the aforementioned examples discuss a home environment. In other examples, the devices and techniques discussed herein can also be set up in an office, public facility, etc.

Figure 6:
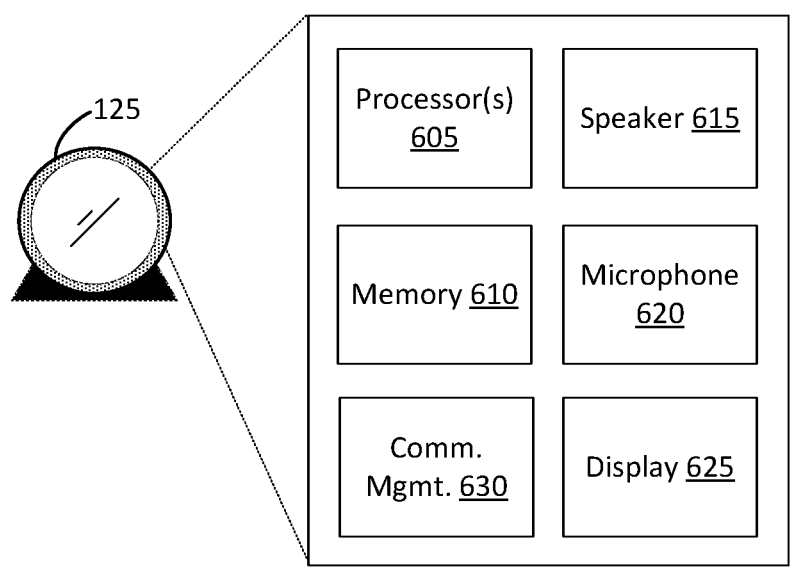
FIG. 6 illustrates an example of an assistant device.

FIG. 6 illustrates an example of an assistant device. In FIG. 6, assistant device 105 includes a processor 605, memory 610, touchscreen display 625, speaker 615, microphone 635, as well as other types of hardware such as non-volatile memory, an interface device, camera, radios, etc. to implement communication management logic 630 providing the techniques disclosed herein. Various common components (e.g., cache memory) are omitted for illustrative simplicity. The assistant device is intended to illustrate a hardware device on which any of the components described in the example of FIGS. 1-3 (and any other components described in this specification) can be implemented. The components of the assistant device can be coupled together via a bus or through some other known or convenient device.

The processor 605 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 605 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD-ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method for facilitating a conversation between a first user at a first location within an environment and a second user at a second location within the environment using devices communicatively coupled with a wireless local area network (WLAN), comprising:
    receiving conversational content having audio content and video content from the first user and directed towards the second user within the environment, the first user being within the first location of the environment;
    determining, by a processor, that the second user is within the second location of the environment, the first location being a different room of the environment than the second location, the second location that the second user is within identified using one or both of audio recognition or visual recognition;
    determining, by the processor, devices within the second location that are capable of providing playback of the audio content and devices within the second location that are capable of providing playback of the video content of the conversational content;
    playing back the audio content using the devices within the second location that are capable of providing playback of the audio content;
    playing back the video content using the devices within the second location that are capable of providing playback of the video content;
    determining how the second user has manipulated other devices within the second location, determining that the second user has manipulated other devices includes determining that the other devices have switched operational states from enabled to disabled;
    predicting, by the processor, that the second user will move from the second location to a third location within the environment based on the manipulation of the other devices within the second location, the third location being a different room within the environment than the first location or the second location;
    determining, by the processor, devices within the third location that are capable of playback of the audio content of the conversational content;
    playing back the audio content using the devices within the third location that are capable of providing playback of the audio content; and
    adjusting volume of the playback of the audio content within the second location and the third location such that the volume of the playback of the audio content within the third location increases and the volume of the playback of the audio content within the second location decreases as the second user moves from the second location to the third location.

2. A method, comprising:
    receiving conversational content having audio content and video content from a first user and directed towards a second user within an environment, the first user being within a first location of the environment;
    determining, by a processor, that the second user is within a second location of the environment, the first location being different than the second location;
    determining, by the processor, devices within the second location that are capable of providing playback of the audio content and devices within the second location that are capable of providing playback of the video content of the conversational content;
    playing back the audio content of the conversational content using the devices within the second location that are capable of providing playback of the audio content;
    playing back the video content of the conversational content using the devices within the second location that are capable of providing playback of the video content;
    determining how the second user has used other devices within the second location, determining how the second user has used the other devices includes determining that the other devices have switched operational states from enabled to disabled;
    predicting that the second user will move from the second location to a third location within the environment based on how the second user used the other devices within the second location, the third location being different than the first location or the second location;
    determining devices within the third location that are capable of playback of the audio content of the conversational content; and
    playing back the audio content using the devices within the third location that are capable of providing playback of the audio content.

3. The method of claim 2, wherein determining that the second user is within the second location is based on one or both of audio recognition or visual recognition.

4. The method of claim 3, further comprising:
    determining that the second user is moving from the second location to the third location; and
    adjusting volume of the playback of the audio content within the second location and the third location based on the determination that the second user is moving from the second location to the third location.

5. The method of claim 4, wherein adjusting the volume of the playback includes adjusting the volume such that the volume of the playback of the audio content within the third location increases and the volume of the playback of the audio content within the second location decreases as the second user moves from the second location to the third location.

6. The method of claim 2, further comprising:
    determining characteristics of the second location corresponding to the second user, wherein the devices used to play back the audio content or the video content are selected based on the characteristics of the second location.

7. The method of claim 6, wherein the characteristics include privacy expectations of the second user in the second location.

8. The method of claim 7, wherein the privacy expectations of the second user are based on a type of location of the second location within the environment.

9. A computer program product, comprising one or more non-therein, the computer program instructions being configured such that, when executed by one or more computing devices, the computer program instructions cause the one or more computing devices to:
receive conversational content having audio content and video content from a first user and directed towards a second user within an environment, the first user being within a first location of the environment;
determine that the second user is within a second location of the environment, the first location being different than the second location;
determine devices within the second location that are capable of providing playback of the audio content and devices within the second location that are capable of providing playback of the video content of the conversational content;
play back the audio content of the conversational content using the devices within the second location that are capable of providing playback of the audio content;
play back the video content of the conversational content using the devices within the second location that are capable of providing playback of the video content;
determine how the second user has used other devices within the second location, determining how the second user has used the other devices includes determining that the other devices have switched operational states from enabled to disabled;
predict that the second user will move from the second location to a third location within the environment based on how the second user used the other devices within the second location, the third location being different than the first location or the second location;
determine devices within the third location that are capable of playback of the audio content of the conversational content; and
play back the audio content using the devices within the third location that are capable of providing playback of the audio content.

10. The computer program product of claim 9, wherein determining that the second user is within the second location is based on one or both of audio recognition or visual recognition.

11. The computer program product of claim 9, the computer program instructions cause the one or more computing devices to:
determine that the second user is moving from the second location to the third location; and
adjust volume of the playback of the audio content within the second location and the third location based on the determination that the second user is moving from the second location to the third location.

12. The computer program product of claim 11, wherein adjusting the volume of the playback includes adjusting the volume such that the volume of the playback of the audio content within the third location increases and the volume of the playback of the audio content within the second location decreases as the second user moves from the second location to the third location.

13. The computer program product of claim 9, the computer program instructions cause the one or more computing devices to:
determine characteristics of the second location corresponding to the second user, wherein the devices used to play back the audio content or the video content are selected based on the characteristics of the second location.

14. The computer program product of claim 13, wherein the characteristics include privacy expectations of the second user in the second location.

15. The computer program product of claim 14, wherein the privacy expectations of the second user are based on a type of location of the second location within the environment.

16. An electronic device, comprising:
one or more processors; and
memory storing instructions, wherein the processor is configured to execute the instructions such that the processor and memory are configured to:
receive conversational content having audio content and video content from a first user and directed towards a second user within an environment, the first user being within a first location of the environment;
determine that the second user is within a second location of the environment, the first location being different than the second location;
determine devices within the second location that are capable of providing playback of the audio content and devices within the second location that are capable of providing playback of the video content of the conversational content;
play back the audio content of the conversational content using the devices within the second location that are capable of providing playback of the audio content;
play back the video content of the conversational content using the devices within the second location that are capable of providing playback of the video content;
determine how the second user has used other devices within the second location, determining how the second user has used the other devices includes determining that the other devices have switched operational states from enabled to disabled;
predict that the second user will move from the second location to a third location within the environment based on how the second user used the other devices within the second location, the third location being different than the first location or the second location;
determine devices within the third location that are capable of playback of the audio content of the conversational content; and
play back the audio content using the devices within the third location that are capable of providing playback of the audio content.

17. The electronic device of claim 16, wherein determining that the second user is within the second location is based on one or both of audio recognition or visual recognition.

18. The electronic device of claim 16, wherein the processor is configured to execute the instructions such that the processor and memory are configured to:
determine that the second user is moving from the second location to the third location; and
adjust volume of the playback of the audio content within the second location and the third location based on the determination that the second user is moving from the second location to the third location.

19. The electronic device of claim 18, wherein adjusting the volume of the playback includes adjusting the volume such that the volume of the playback of the audio content within the third location increases and the volume of the playback of the audio content within the second location decreases as the second user moves from the second location to the third location.

20. The electronic device of claim 16, wherein the processor is configured to execute the instructions such that the processor and memory are configured to:
   determine characteristics of the second location corresponding to the second user, wherein the devices used to play back the audio content or the video content are selected based on the characteristics of the second location.

21. The electronic device of claim 20, wherein the characteristics include privacy expectations of the second user in the second location.

22. The electronic device of claim 21, wherein the privacy expectations of the second user are based on a type of location of the second location within the environment.

23. The method of claim 7, further comprising:
   determining activities performed by the second user in the second location, wherein the privacy expectations are based on the activities.

\* \* \* \* \*